US008253842B2

United States Patent
Yoshida et al.

(10) Patent No.: US 8,253,842 B2
(45) Date of Patent: Aug. 28, 2012

(54) ELECTRONIC DEVICE INCLUDING AN OPERATION MEMBER TO OPERATE A SWITCH PART OR THE LIKE

(75) Inventors: Norihiro Yoshida, Yokohama (JP); Kimiharu Yanagisawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 490 days.

(21) Appl. No.: 12/486,624

(22) Filed: Jun. 17, 2009

(65) Prior Publication Data

US 2009/0316039 A1 Dec. 24, 2009

(30) Foreign Application Priority Data

Jun. 19, 2008 (JP) .................................. 2008-160091
Dec. 26, 2008 (JP) .................................. 2008-333096

(51) Int. Cl.
*H04N 5/225* (2006.01)
(52) U.S. Cl. ......... 348/340; 348/373; 348/374; 348/375
(58) Field of Classification Search .......... 348/373–375, 348/340
See application file for complete search history.

(56) References Cited

U.S. PATENT DOCUMENTS

| 5,499,052 A * | 3/1996 | Nakanishi et al. ......... 348/220.1 |
| 7,872,685 B2 * | 1/2011 | Chen et al. .................... 348/372 |
| 2006/0114348 A1 * | 6/2006 | Fujii et al. ..................... 348/373 |
| 2006/0250482 A1 * | 11/2006 | Silverbrook et al. ......... 347/109 |

FOREIGN PATENT DOCUMENTS

| JP | 10-125054 A | 5/1998 |
| JP | 2002119307 B2 | 4/2002 |
| JP | 2007-172989 A | 7/2007 |
| JP | 2009-037196 A | 2/2009 |

* cited by examiner

*Primary Examiner* — John Villecco
*Assistant Examiner* — Selam Gebriel
(74) *Attorney, Agent, or Firm* — Dickstein Shapiro LLP (57) ABSTRACT

An electronic device includes: at least one switch which is arranged at a printed circuit board; at least one operation member which is capable of pressing the at least one switch; a support member which has at least one arm part configured to support the at least one operation member movably; and an exterior member which abuts to the support member and has at least one hole into which the at least one operation member is inserted, wherein the support member further has at least one positioning member which is uncovered by the exterior member.

16 Claims, 9 Drawing Sheets

ELECTRONIC DEVICE INCLUDING AN OPERATION MEMBER TO OPERATE A SWITCH PART OR THE LIKE

CROSS-REFERENCE TO THE RELATED APPLICATION

The entire contents of Japanese patent applications No. JP 2008-160091, filed on Jun. 19, 2008, and No. JP 2008-333096, filed on Dec. 26, 2008, of which the convention priorities are claimed in this application, are incorporated hereinto by reference.

BACKGROUND OF THE INVENTION

1. Field of the Invention

The present invention relates to an electronic device which includes at least one operation member, and especially relates to a photographic device which has the electronic device including the at least one operation member.

2. Description of the Related Art

Recently, various electronic devices are widely used. In general, an electronic device is provided internally with a printed circuit board which is equipped with a plurality of electronic parts, and when the printed circuit board is provided with a switch part, at least one operation button (operation member) which is configured to operate the switch part from outside is arranged at an exterior position corresponding to the switch part.

For example, in a photographic device such as a digital camera, various buttons each of which is configured to switch functions such as various operational modes, macro modes, or self-timer, or to set such as photographing conditions, are provided.

Thus, in the photographic device including a plurality of buttons, the likes of such as backlash or unsteadiness of an operation button, or unevenness of a clearance between an operation button attachment hole provided at an exterior cover and the operation button are factors in decreasing the quality of products. Therefore, a support member integrated with at least one operation button is proposed, to decrease such backlash, unsteadiness, and unevenness of the clearance.

However, in an electronic device having the support member integrated with at least one operation button, it is difficult to dispose the exterior cover relative to the support member integrated with at least one operation button such that a center of the operation button attachment hole of the exterior cover conforms with a center of the operation button integrated structure, and it is necessary to provide a member used for positioning separately, and to adjust an arrangement position through the positioning member.

To solve this problem, JP 2007-172989 A proposes a mechanism which is configured to align a plurality of operation buttons each of which is capable of being pressed relative to a plurality of operation button attachment holes respectively, without using the positioning member. In this mechanism, when the operation button is pushed toward an operation direction, the operation button swings relative to the corresponding operation button attachment hole, when the operation button returns to an initial position by a biasing member which biases the operation button in a direction that the operation button protrudes from the operation button attachment hole, the aligning is carried out by a taper face of a periphery part of the operation button and a taper face of the operation button attachment hole.

On the other hand, in recent years, a photographic device equipped with a metallic exterior member has been produced, to provide a user with the impression of a good external appearance and expensive-looking quality. However, when the photographic device is an electronic device, due to the metallic exterior member having electrical conductivity, the exterior member may be charged (discharged) by static electricity. In addition, the exterior member functions as an antenna and becomes easy to pick up noise from the surroundings, and current generated by the noises may affect internal electric parts negatively.

In contrast, if the exterior member is electrically connected with a grounding pattern of an internal electric circuit, and the potential of the exterior member is made to be the same potential as the grounding potential, the generated current flows to the grounding pattern and then the electric parts can be protected. For example, such a connection method is already known, i.e., by fixing an end of a metal section which has elasticity to a main body of an electronic device, together with a lead wire by a screw or the like, and connecting the lead wire with a grounding pattern of an internal electric circuit by soldering, and when the exterior member is attached to the main body of the electronic device, another end of the metal section is biased and put into contact with an exposed part of the metallic surface of the exterior member, and thus the exterior member is electrically connected with the grounding pattern of the internal electric circuit.

However, as a method of electrically connecting an exterior member with a printed circuit board inside a main body, providing new parts raises a problem of an increase of cost and assembly operation load.

Unevenness of a clearance generated between an operation button attachment hole of an exterior cover (exterior member) and an operation button (operation member) occurs only after the exterior cover is assembled to a main body. The exterior cover is always pressed and put into contact with other members by a biasing member provided at the operation button or a support member, for conducting with other parts or the like. Therefore, it is difficult to adjust the clearance to have evenness after the exterior cover is attached. In addition, as a method of making the potential of the exterior member having electrical conductivity to be the same potential as the grounding potential of a printed circuit board inside a main body, it is difficult to electrically connect the exterior member having electrical conductivity with the printed circuit board inside the main body, without providing new parts or increasing assembly processes.

SUMMARY OF THE INVENTION

At least an object of the present invention is to provide, for example, an electronic device which includes an operation button device having at least one operation button and is capable of performing positioning of an exterior member to correct unevenness of a clearance between an operation button of a device which has a button support member formed integrally with the at least one operation button, and an operation button attachment hole of the exterior member, without an increase of a number of parts and considerable change in assembly processes.

At least a further object of the present invention is to provide, for example, an electronic device provided with an exterior member having electrical conductivity, the electronic device including an operation button device having a mechanism which is configured to make the potential of the exterior member to be the same potential as the grounding potential of a printed circuit board, without an increase of a number of parts and assembly operation load.

In addition, at least a further object of the present invention is to provide, for example, a photographic device including the above-mentioned electronic devices.

In light of the above-mentioned, the present invention proposes, for example, an electronic device including: at least one switch which is arranged at a printed circuit board; at least one operation member which is capable of pressing the at least one switch; a support member which has at least one arm part configured to support the at least one operation member movably; and an exterior member which abuts to the support member and has at least one hole into which the at least one operation member is inserted, wherein the support member further has at least one positioning member which is uncovered by the exterior member.

In addition, the present invention proposes, for example, a photographic device including the above-mentioned electrical device.

BRIEF DESCRIPTION OF THE DRAWINGS

The invention will be described further below with reference to exemplary embodiments and the accompanying schematic drawings, in which:

FIG. 15 is a schematic view illustrating another example of an inside of an exterior cover of the digital camera equipped with the electronic device according to the present invention viewed from.

DETAILED DESCRIPTION OF THE PREFERRED EMBODIMENTS

Hereafter, an electronic device (operation button device) and a photographic device according to the present invention will be explained. Though as an embodiment of the photographic device provided with the operation button device of the present invention, a digital camera (digital still camera) is illustrated, the operation button device of the present invention can be applied to other photographic devices such as a silver salt camera, and other electronic devices.

Figure 1:
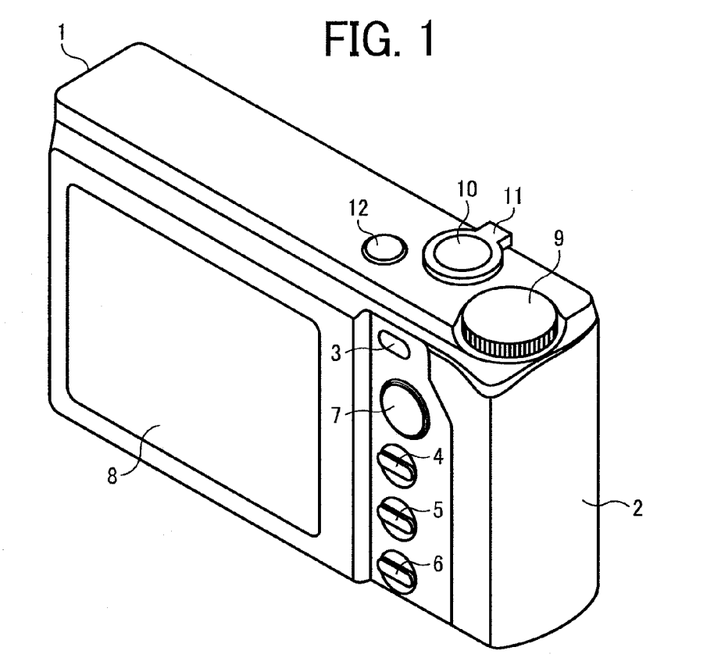
FIG. 1 is a rear perspective view illustrating an external outline of a digital camera which is an example of a device equipped with an electronic device according to an embodiment of the present invention.

As an example of a device which is provided with the operation button device of the present invention, a digital camera will be explained below. FIG. 1 is a rear perspective view illustrating an external outline of the digital camera, and FIG. 2 is a front perspective view of the digital camera.

As illustrated in FIG. 1, in view of a back surface, the digital camera 1 includes a grip part 2 on a right side, a zoom lever 11, a release button 10, a power supply button 12 and a mode switching dial 9 arranged at an upper surface. A LCD 8, and as operation buttons a reproduction button 3, an ADJ button 7, a MENU button 4, a self-timer button 5, and a DISP button 6 are arranged at the back surface.

Figure 2:
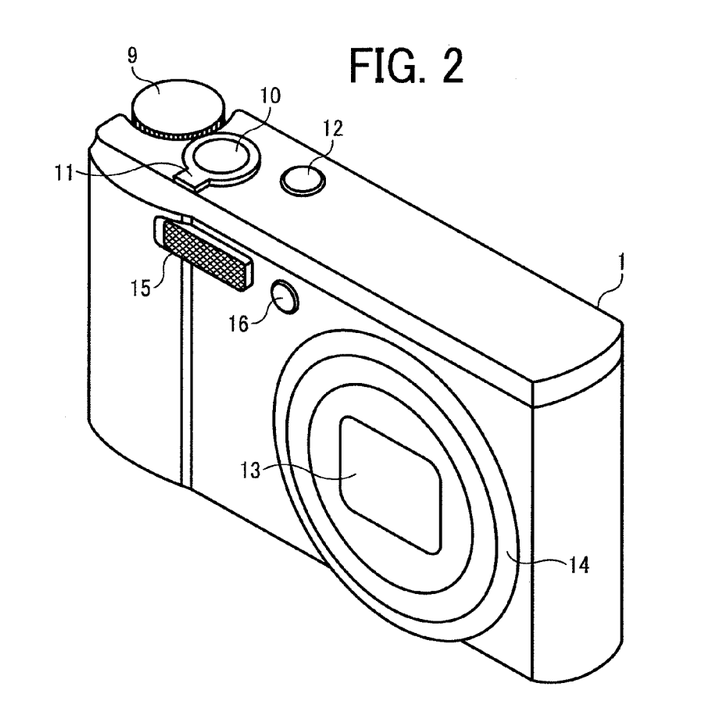
FIG. 2 is a front perspective view illustrating the external outline of the digital camera which is an example of the device equipped with the electronic device according to the embodiment of the present invention.

In addition, as illustrated in FIG. 2, a photographing lens 13 is arranged at an approximate center of a front surface of the digital camera 1, and a ring 14 is arranged at its surroundings. In addition, a strobe light 15 which emits fill light when a photograph is taken at low illumination and a LED 16 which emits fill light for autofocusing are provided. Furthermore, a card slot which is capable of being inserted with a memory card and a battery room which is capable of being inserted with a battery are provided, and a battery lid (not illustrated) which covers the card slot and the battery room is provided at an undersurface of the camera.

Figure 3:
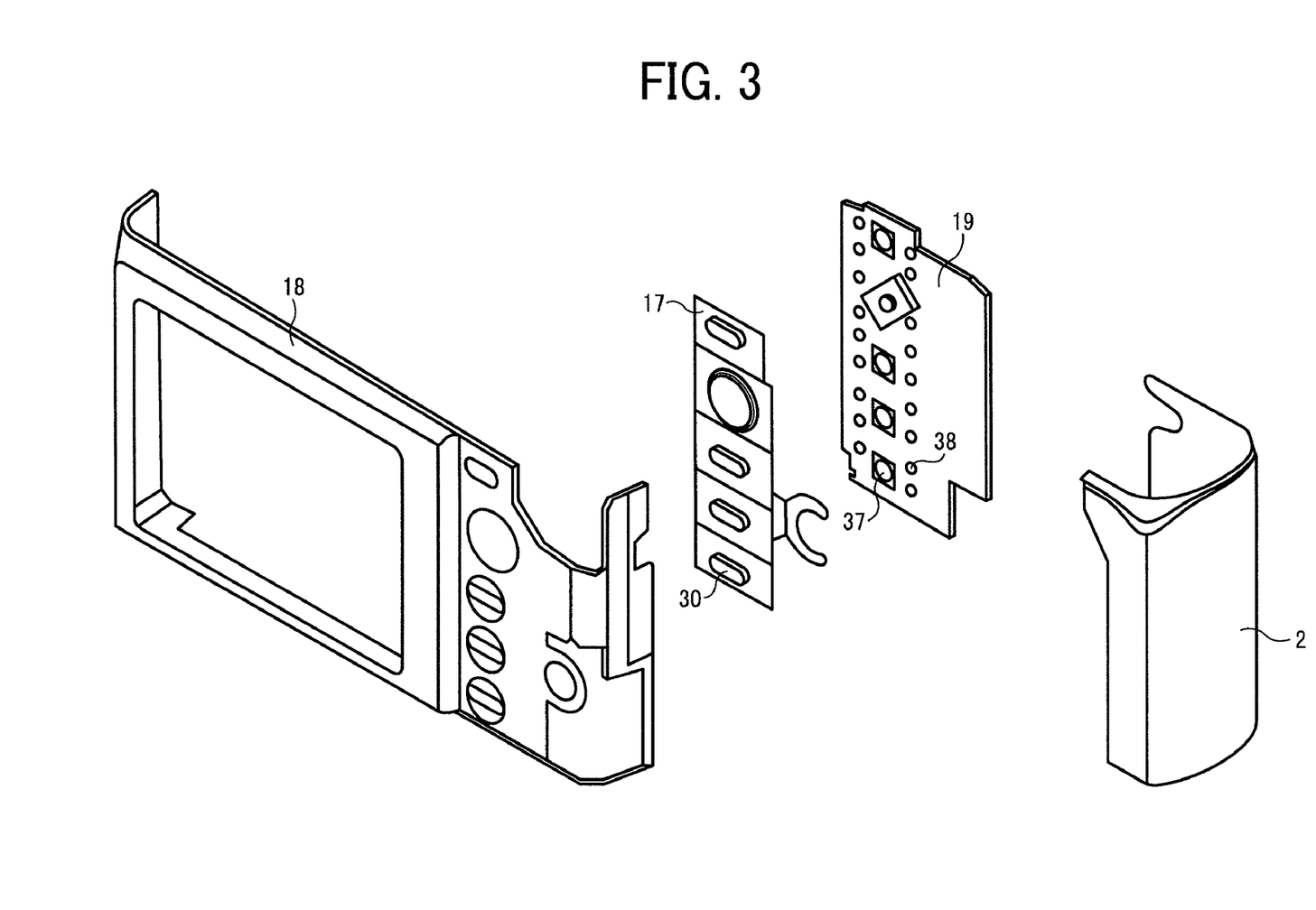
FIG. 3 is an exploded perspective view of the digital camera which is an example of the device equipped with the electronic device according to the embodiment of the present invention.

FIG. 3 is an exploded perspective view of the digital camera which is an example of the device equipped with the operation button device of the present invention. As illustrated in FIG. 3, a button support member 17 which supports at least one operation button (keytop) 30 and is formed integrally with the operation button 30 is placed to be sandwiched between an exterior cover 18 and a printed circuit board 19 and assembled. A part where the button support member 17 is attached is covered by the grip part 2 at the end. At least one switch (tactile switch) 37 and a pattern part 38 are provided at the printed circuit board 19. The switch 37 outputs a prescribed electric signal by a push operation.

Figure 4:
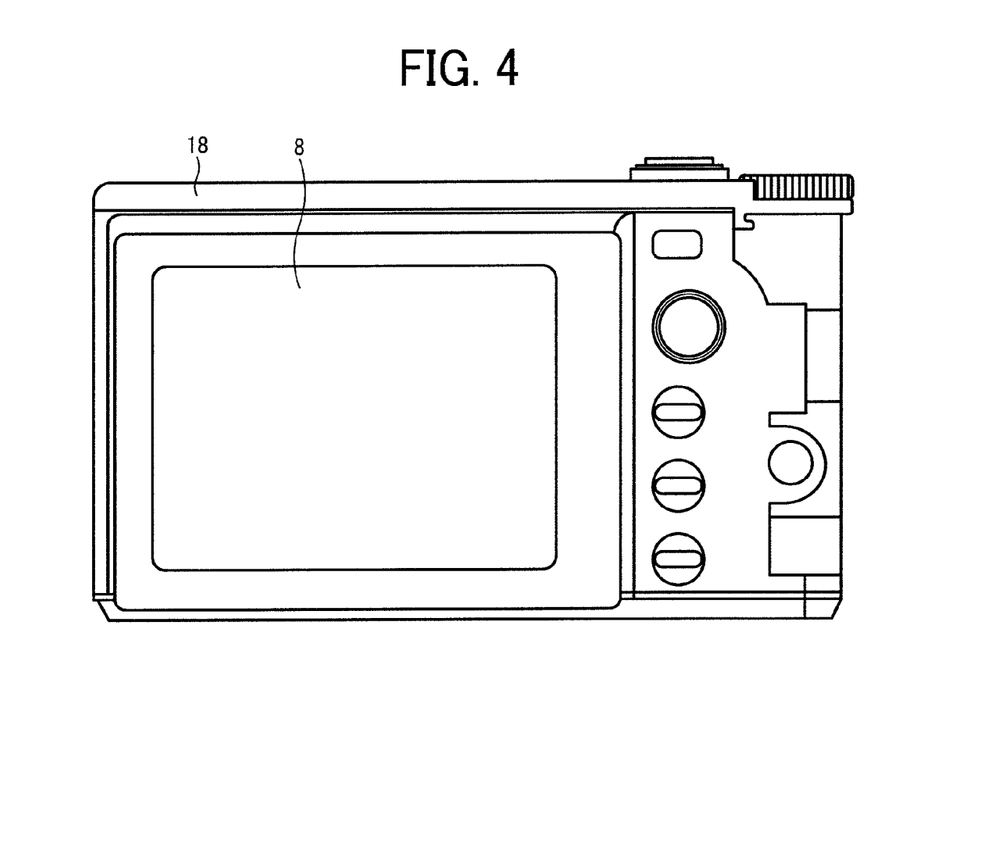
FIG. 4 is a rear view illustrating a state in which each member except a grip part in the exploded perspective view illustrated in FIG. 3, has been assembled.

FIG. 4 is a rear view of the digital camera at a state in which the button support member 17 is placed to be sandwiched between the exterior cover 18 and the printed circuit board 19 and assembled, whilst before the grip part 2 is attached to the exterior cover 18 in the exploded perspective view illustrated in FIG. 3. After the button support member 17 is sandwiched between the exterior cover 18 and the printed circuit board 19 and assembled, the button support member 17 is covered by the exterior cover 18 and can not move, as illustrated in FIG.

4. It is necessary to detach the exterior cover 18 again to correct a position of the button support member 17.

Figure 5:
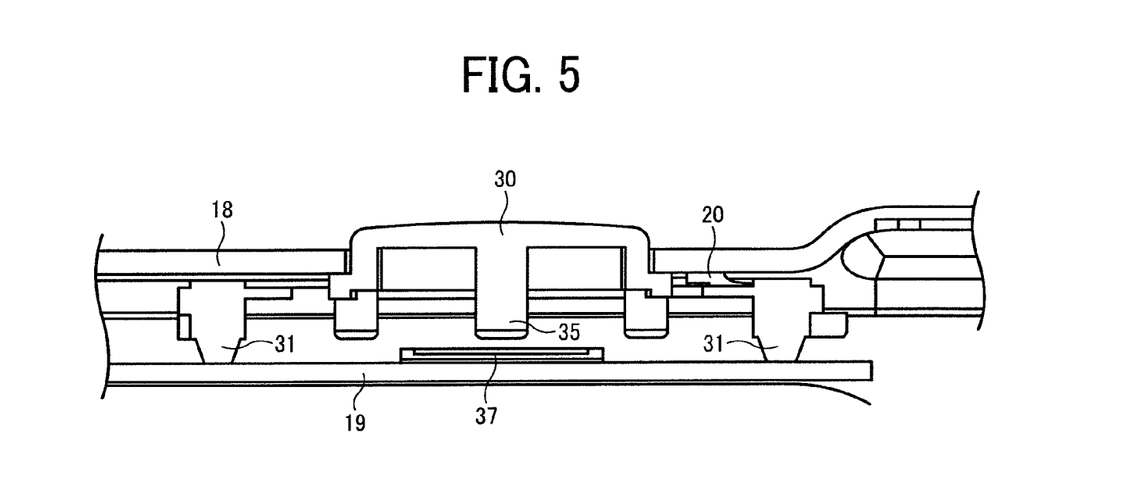
FIG. 5 is a part of a cross-section of an embodiment of the electronic device according to the present invention.

FIG. 5 is an example of a cross-section of the operation button device of the present invention which is applied to the digital camera illustrated in FIGS. 1 to 4. The button support member attached inside the exterior cover 18 is always pressed by the exterior cover 18 through at least one biasing member 20, as illustrated in FIG. 5. The operation switch 30 is inserted into (or fitted to) a hole of the exterior cover 18 and protrudes.

Figure 6:
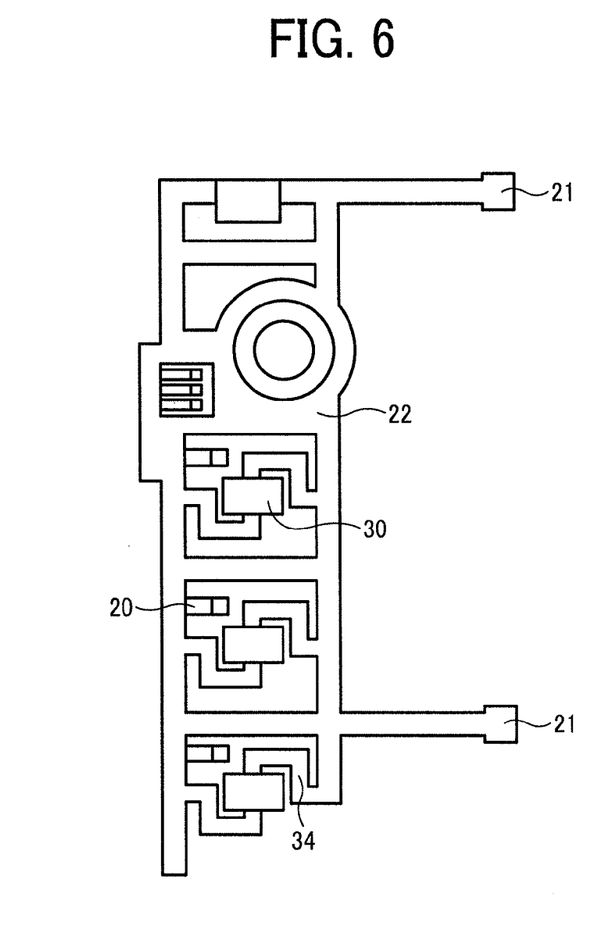
FIG. 6 is a front view illustrating an embodiment of a button support member of the electronic device according to the present invention.

FIG. 6 is a front view of an embodiment of the button support member which has at least one positioning member in the operation button device of the present invention. A button support member 22 has at least one biasing member 20 and at least one rod-shaped positioning member 21, as illustrated in FIG. 6. The at least one positioning member 21, together with the operation button (keytop) 30 are formed integrally with the button support member 22, therefore an increase of a number of parts by separately providing parts for positioning is not necessary. The button support member 22 has an integrally moulded arm part 34, and the arm part 34 has elasticity. As for the integral molding, mold forming is desirable. In addition, the number of the operation buttons (keytop) 30 arranged on the button support member 22 is not especially limited, and is selected appropriately according to an arrangement of corresponding switches.

The shape of the at least one positioning member 21 is not especially limited, as long as the at least one positioning member 21 protrudes from the exterior cover 18 and is capable of being held. The at least one positioning member 21 can be a protruding shape, or a ring shape or the like, other than the rod shape. In addition, the positioning member can be provided with a hole or a concave portion so that it is easy to maintain and operate when positioning.

Figure 7:
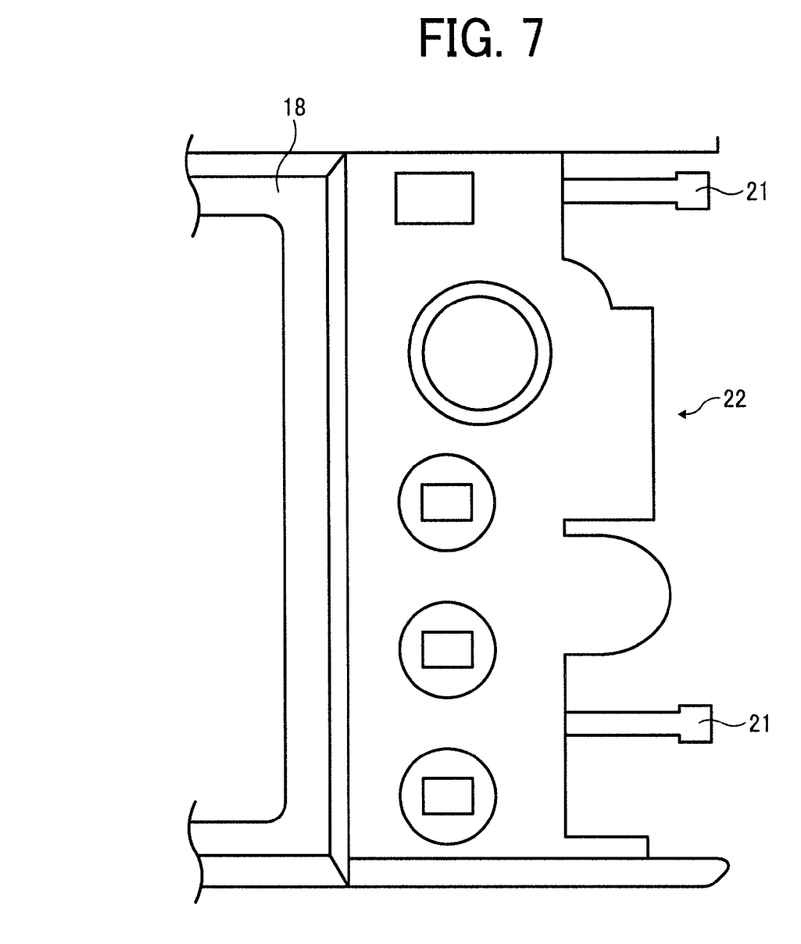
FIG. 7 is a rear view illustrating when the electronic device of an embodiment of the present invention is assembled to the digital camera according to the present invention.

FIG. 7 is a rear view illustrating a case when the button support member 22 of the present invention illustrated in FIG. 6 is assembled to the digital camera illustrated in FIGS. 1 to 4. As illustrated in FIG. 7, when the button support member 22 is sandwiched between the exterior cover 18 and the printed circuit board 19 (not illustrated) and assembled, the button support member 22 is covered by the exterior cover 18. However, the at least one positioning member 21 is not covered by the exterior cover 18 and protrudes from the exterior cover 18. Therefore, the button support member 22 (not illustrated) arranged under the exterior cover 18 can be moved by holding the at least one rod-shaped positioning member 21 which protrudes from the exterior cover 18 and moving the at least one positioning member 21, after the exterior cover 18 has been attached. And thus, a worker can adjust a position of the operation button while directly making a visual confirmation of a clearance generated between an operation button attachment hole of the exterior cover 18 and the operation button. Therefore, assembly operation and adjustment work become easy. The at least one positioning member 21 is covered and shielded by the grip part (not illustrated), by assembling the grip part to the exterior cover 18.

A material of the grip part is not especially limited, and can be selected appropriately according to such as operability and functionality. For example, high operability can be obtained when the grip part is made of rubber, and various shapes can be formed when the grip part is made of resin, and an expensive-looking product can be obtained when the grip part is made of metal.

Figure 8:
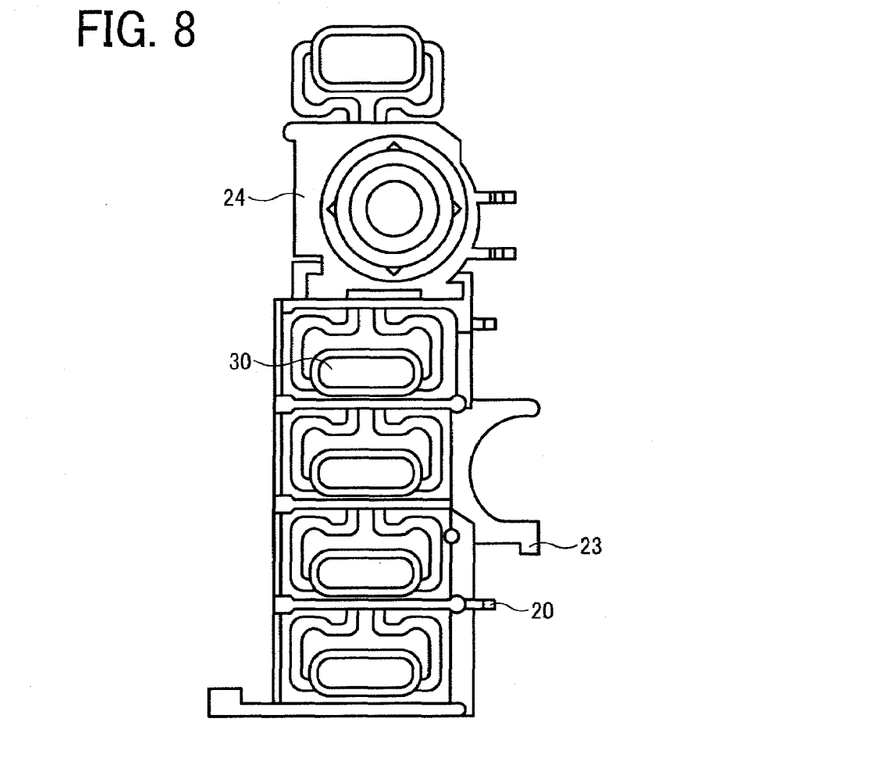
FIG. 8 is a front view illustrating another embodiment of the button support member of the electronic device according to the present invention.

FIG. 8 is a front view illustrating another example of the button support member which has the at least one positioning member. The button support member 24 has at least one biasing member 20 and at least one positioning member 23 with a protruding shape, as illustrated in FIG. 8. The at least one positioning member 23, together with the operation button (keytop) 30 are formed integrally with the button support member 24, therefore an increase in the number of parts by separately providing parts for positioning is not necessary.

Figure 9:
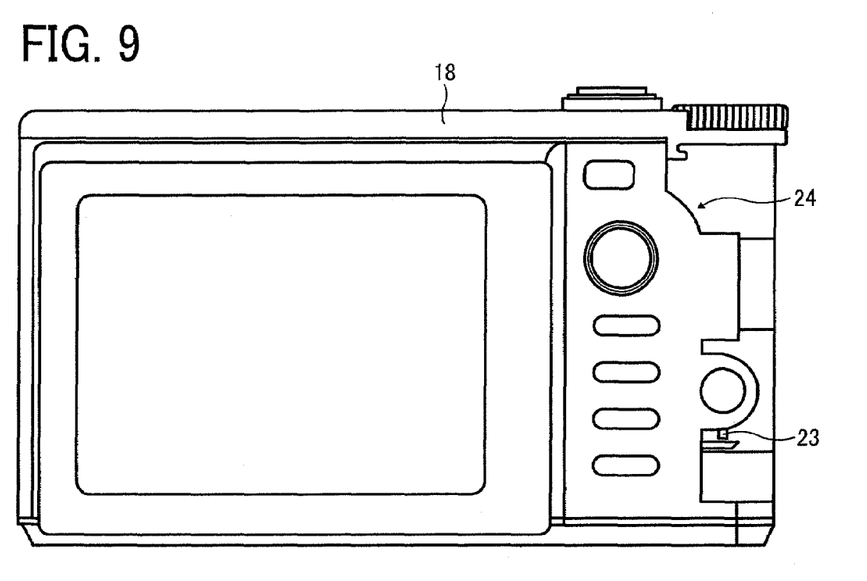
FIG. 9 is a rear view when the electronic device of another embodiment of the present invention is assembled to the digital camera according to another embodiment of the present invention.

FIG. 9 is a rear view illustrating a case when the button support member 24 illustrated in FIG. 8 is assembled to the digital camera illustrated in FIGS. 1 to 4. As illustrated in FIG. 9, when the button support member 24 is placed to be sandwiched between the exterior cover 18 and the printed circuit board 19 (not illustrated), the button support member 24 is covered by the exterior cover 18. However, the at least one positioning member 23 is not covered by the exterior cover 18 and protrudes from the exterior cover 18. Therefore, the button support member 24 (not illustrated) arranged under the exterior cover 18 can be moved by holding the protruding shaped at least one positioning member 23 which protrudes from the exterior cover 18 with tweezers or the like, and moving the at least one positioning member 23, after the exterior cover 18 has been attached. Therefore, the worker can adjust a position of the operation button while directly making a visual confirmation of a clearance generated between the operation button attachment hole of the exterior cover 18 and the operation button. Therefore, the assembly operation and adjustment work become easy. In addition, the at least one positioning member 23 is covered and shielded with the grip part (not illustrated), by assembling the grip part to the exterior cover 18.

Figure 10:
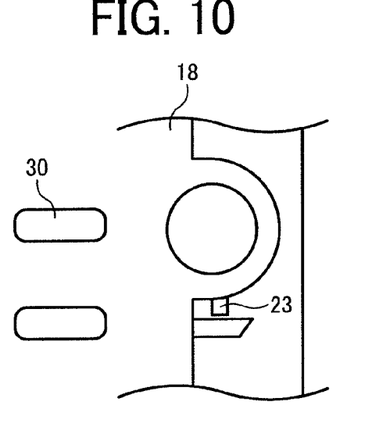
FIG. 10 is an enlarged view of a rear view when the button support member of the electronic device according to the present invention is assembled to the digital camera.

FIG. 10 is an enlarged view illustrating a neighborhood of the at least one positioning member 23 in the rear view of the digital camera illustrated in FIG. 9.

Figure 11:
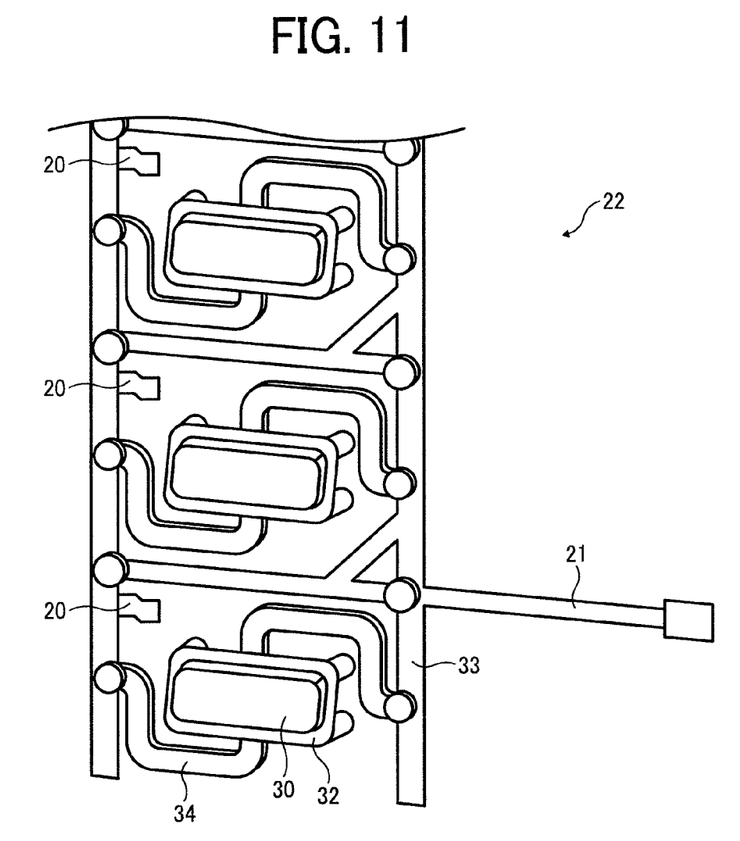
FIG. 11 is a partial perspective view of the button support member of the electronic device according to the present invention, viewed from an external side.
Figure 12:
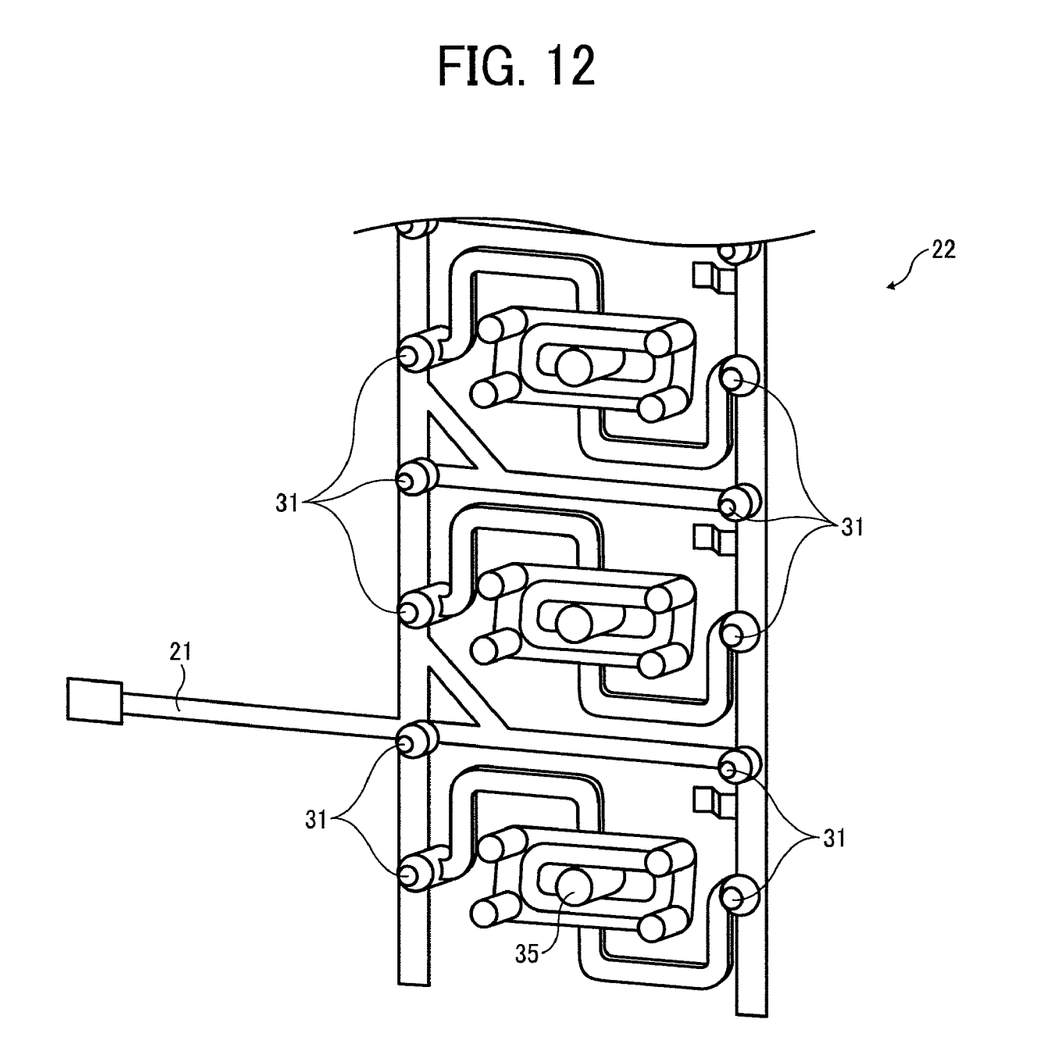
FIG. 12 is a partial perspective view of the button support member of the electronic device according to the present invention, viewed from an internal side.
Figure 13:
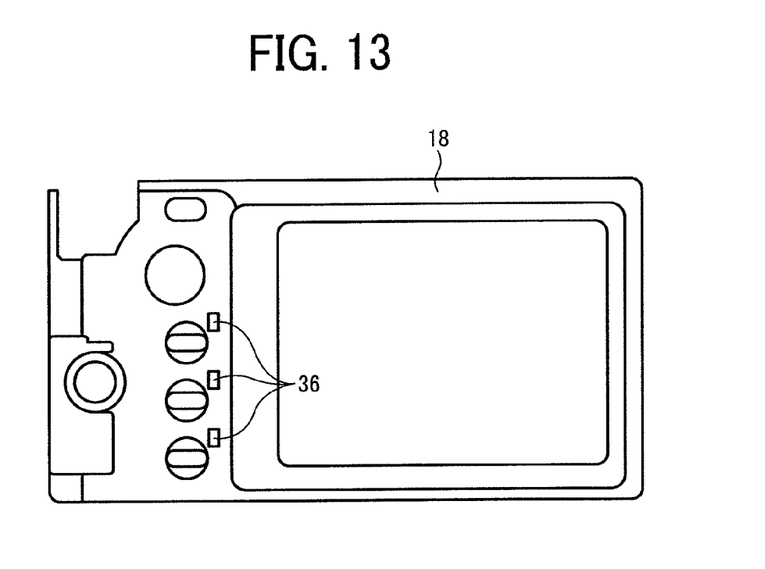
FIG. 13 is a schematic view illustrating an example of an inside of an exterior cover of the digital camera equipped with the electronic device according to the present invention.
Figure 14:
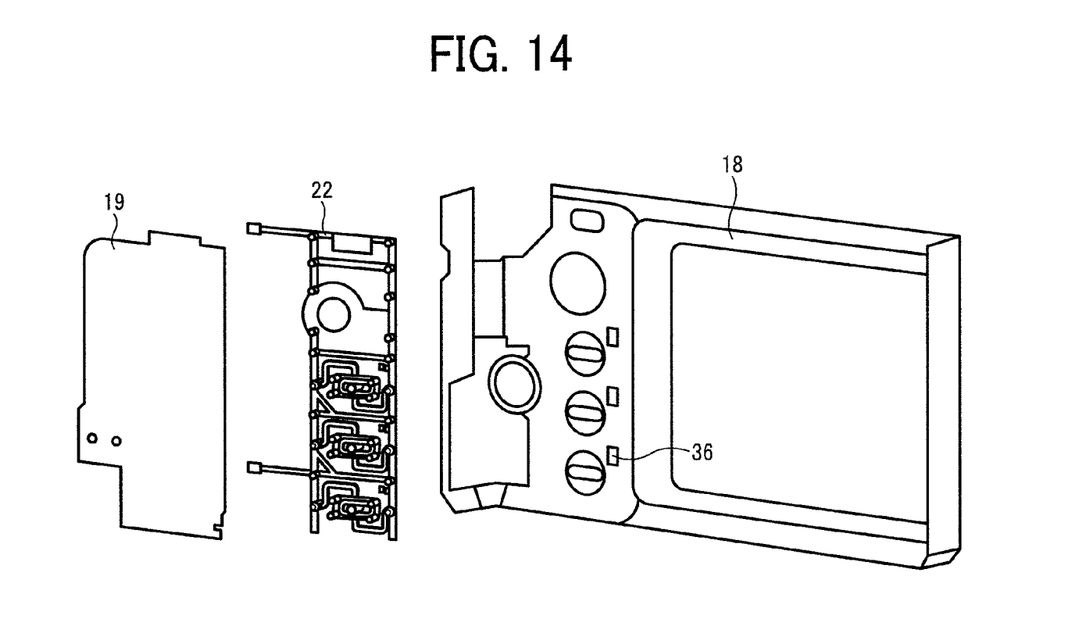
FIG. 14 is an exploded perspective view of an example of the digital camera equipped with the electronic device according to the present invention.

Hereafter, in a state where an exterior member having electrical conductivity is assembled to a camera main body, a structure with which the potential of the exterior member is made to be the same potential as the grounding potential of the printed circuit board will be explained, with reference to FIGS. 11 to 14. FIG. 1 and FIG. 12 are partial enlarged views of the button support member 22 of the present invention illustrated in FIG. 6. FIG. 11 is a perspective view viewed from the outside, and FIG. 12 is a perspective view viewed from the inside. FIG. 13 is a schematic view of an inward side of the exterior member attached with the button support member 22 illustrated in FIG. 11 and FIG. 12, and FIG. 14 is an exploded perspective view illustrating a state in which the button support member 22 is placed between the exterior cover 18 and the printed circuit board 19 and assembled.

As illustrated in FIG. 3, on the printed circuit board 19, the at least one tactile switch 37 which is configured to conduct by pressing is mounted, and the pattern part 38 which is the grounding potential is arranged.

The button support member 22 includes the at least one keytop 30, at least one flange 32, a frame part 33, at least one arm part 34 which connects the at least one flange 32 and the frame part 33, and at least one press boss 35 which presses the corresponding at least one tactile switch 37.

The at least one flange 32 has functions such as prevention of entry of a foreign substance and uplift prevention of the at least one keytop 30. The at least one arm part 34 having elasticity due to the button support member 22 is formed by molding. The at least one boss 35 presses the corresponding at least one tactile switch 37 down by pushing the corresponding at least one keytop 30 with a finger etc., and the at least one keytop 30 returns to an initial position by the elasticity of the at least one arm part 34 when the finger is moved from the at least one keytop 30.

At least one grounding boss 31 which abuts to the pattern part 38 of the printed circuit board and is electrically-grounded is provided at the frame part 33. The frame part can be electrically connected with the pattern part 38 of the printed circuit board by applying metal plating to the frame part, therefore a nonconductive material can be used for the material of the frame part.

In addition, the at least one biasing member 20 is provided at the frame part 33. The at least one biasing member 20 is arranged at a position which abuts to the exterior cover 18. When the exterior cover 18 is assembled to the frame part 33, the at least one biasing member 20 bows inward by elasticity of the mold, and biases the button support member 22 including the frame part 33 towards an inner face of the exterior cover 18.

In addition, the at least one positioning member 21 is provided at the frame part 33. The at least one positioning member 21 is formed integrally with the frame part 33 which constitutes the button support member 22, therefore an increase of the number of parts by separately providing parts for positioning is not necessary.

Hereafter, a case in which the exterior cover 18 is formed with a conductive member such as aluminum will be explained. When the exterior cover 18 is formed of aluminum, generally an external processing is necessary, and an alumite treatment is carried out generally. In addition, paint and coating are possible. Since the inner face becomes a nonconductive face when the alumite treatment is carried out, at least one earth area 36 illustrated in FIG. 14 is provided by a secondary processing. As a result, an electric connection is possible between the at least one earth area 36 and the at least one biasing member 20 which is applied with metal plating. The at least one earth area 36 of the exterior cover 18 and the at least one biasing member 20 are electrically connected, by sandwiching the button support member 22 with the exterior cover 18 and the printed circuit board 19 and assembling. The at least one biasing member 20 and the at least one grounding boss 31 are electrically connected by the metal plating. The exterior cover 18 and the pattern part 38 of the printed circuit board 19 are electrically connected by electrically connecting the grounding boss 31 and the pattern part 38 of the printed circuit board. In this way, the exterior cover 18 and the pattern part 38 of the printed circuit board 19 are electrically connected, thus the potential of the exterior cover 18 can be made to be the same potential as the grounding potential of the printed circuit board 19 by an easy assembling method and without increasing the number of parts. Therefore, adverse effects by charging of static electricity of the exterior cover 18, and noise which enters inside of the device from the exterior cover 18 or the at least one keytop 30 can be controlled.

Figure 15:
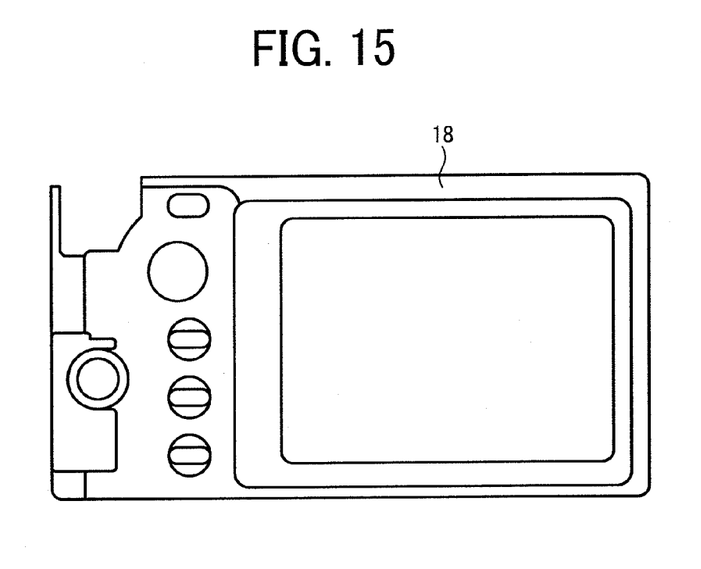
Figure 16:
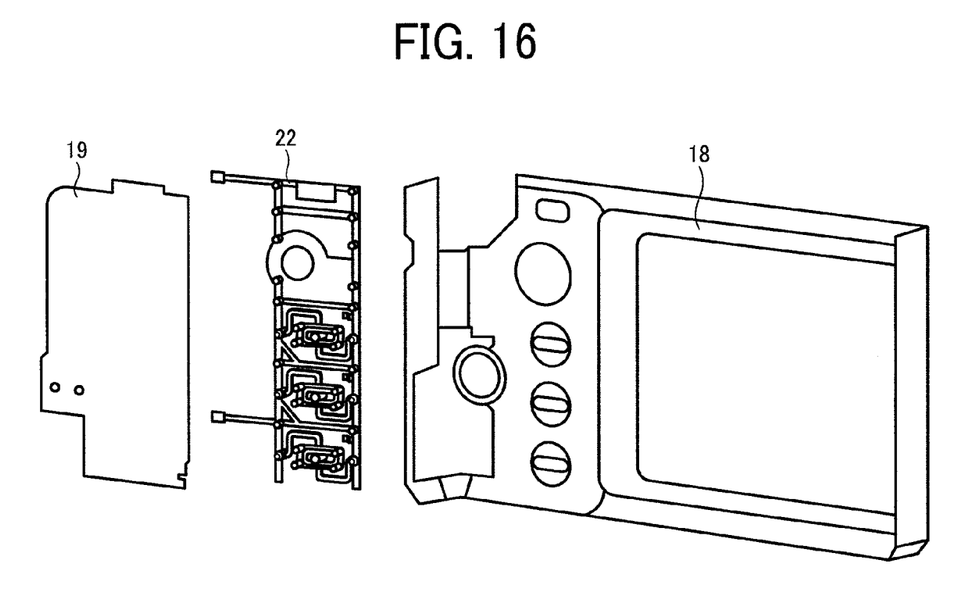
FIG. 16 is an exploded perspective view of another example of the digital camera equipped with the electronic device according to the present invention.

The case in which the exterior cover 18 is formed of aluminum is explained as above, but the material of the exterior cover 18 is not limited to it. Other metallic covers such as stainless steel, or a cover with electrical conductivity are possible, and the present invention can be achieved even when applying metal plating to a molded-in cover. FIG. 15 is a view illustrating an inside of the exterior cover 18 when the at least one earth area is not provided. FIG. 16 is an exploded perspective view illustrating a state in which the button support member 22 is placed between the exterior cover 18 and the printed circuit board 19 and assembled.

According to an aspect of the present invention, unevenness of a clearance between at least one operation member on a support member which is formed integrally with the at least one operation member and an operation member attachment hole of an exterior member can be corrected, even after the at least one operation member (the support member) has been assembled to the exterior member, without increasing the number of parts and changing assembly processes. Specifically, when the clearance is uneven, in the assembly state i.e. without detaching the at least one operation member (the support member) from the exterior member, a worker can correct the clearance while making a visual confirmation, by adjusting a positioning member.

According to a preferable embodiment of the present invention, an exterior member made from a conductive material can be electrically connected with a printed circuit board inside a device, without an addition of new parts, and an increase of cost and assembly operation load. Specifically, in a state where the conductive exterior member is assembled to a device main body, at least one biasing device of a support member comes into contact with the exterior member and presses it, at least one grounding area of a frame part of the support member is grounded with a grounding potential part of the printed circuit board, the exterior member is electrically connected with the grounding potential part of the printed circuit board, and the potential of the exterior member can be made to be the same potential as the grounding potential of the printed circuit board.

According to another preferable embodiment of the present invention, a part of a frame part where a metal plating treatment is performed is electrically connected with a pattern part of a printed circuit board, regardless of the material of a support member.

According to a further preferable embodiment of the present invention, at least one operation member, at least one arm part and a support member are formed integrally, therefore the number of parts and assembly processes can be reduced.

According to a further preferable embodiment of the present invention, unevenness of a clearance between at least one operation member and a corresponding operation member attachment hole of an exterior member is corrected, and a positioning member is covered by a grip part, therefore functionality, operability, and quality of a photographic device can be improved.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:
1. An electronic device, comprising:
at least one switch which is arranged at a printed circuit board;
at least one operation member which is capable of pressing the at least one switch the operation member being movable in a depressing direction;
a support member which has at least one arm part configured to support the at least one operation member movably; and
an exterior member which abuts to the support member and has at least one hole into which the at least one operation member is inserted,
wherein the support member further has at least one positioning member which extends from the support member and is uncovered by the exterior member,
wherein the positioning member extends past the exterior member and protrudes in a direction that is perpendicular to the depressing direction and is not covered by the exterior member even when the exterior member is attached to the support member.

2. An electronic device according to claim 1, wherein the support member has at least one biasing member which is capable of abutting to the exterior member.

3. An electronic device according to claim 2, wherein the at least one biasing member presses the exterior member.

4. An electronic device according to claim 1,
wherein the exterior member has electrical conductivity, the printed circuit board has a grounding potential part with grounding potential, the support member has a frame part, and at least one part of the frame part has a grounding area which is capable of being electrically connected with the grounding potential part,
wherein the exterior member having electrical conductivity is put into contact with the support member and is electrically connected thereof, the support member is capable of being electrically connected with the printed circuit board through the grounding area.

5. An electronic device according to claim 2, wherein the exterior member has electrical conductivity, the printed circuit board has a grounding potential part with grounding potential, the support member has a frame part, and at least one part of the frame part has a grounding area which is capable of being electrically connected with the grounding potential part,
wherein the exterior member having electrical conductivity is put into contact with the support member and is electrically connected thereof, the support member is capable of being electrically connected with the printed circuit board through the grounding area.

6. An electronic device according to claim 3, wherein the exterior member has electrical conductivity, the printed circuit board has a grounding potential part with grounding potential, the support member has a frame part, and at least one part of the frame part has a grounding area which is capable of being electrically connected with the grounding potential part,
wherein the exterior member having electrical conductivity is put into contact with the support member and is electrically connected thereof, the support member is capable of being electrically connected with the printed circuit board through the grounding area.

7. An electronic device according to claim 4, wherein the at least one part of the frame part of the support member is treated with metal plating.

8. An electronic device according to claim 5, wherein the at least one part of the frame part of the support member is treated with metal plating.

9. An electronic device according to claim 6, wherein the at least one part of the frame part of the support member is treated with metal plating.

10. An electronic device according to claim 1, wherein the at least one operation member and the at least one arm part and the support member are formed integrally.

11. An electronic device according to claim 1, wherein the at least one arm part makes the at least one operation member move down from a predetermined position when the at least one operation member is pressed by a force, and brings the at least one operation member back to the predetermined position when the pressing force to the at least one operation member is released.

12. An electronic device according to claim 1, wherein the at least one positioning member protrudes to an area which is not abutting to the exterior member.

13. A photographic device comprising an electronic device according to claim 1, and a photographing part.

14. A photographic device comprising an electronic device according to claim 4, and a photographing part.

15. A photographic device according to claim 13, wherein the photographic device further comprises a grip part which is attached to the exterior member and covers the positioning member.

16. A photographic device according to claim 14, wherein the photographic device further comprises a grip part which is attached to the exterior member and covers the positioning member.

* * * * *